United States Patent
Furukawa et al.

(10) Patent No.: US 9,836,553 B2
(45) Date of Patent: *Dec. 5, 2017

(54) AUTOMATICALLY MODIFYING A TREE STRUCTURE

(71) Applicant: International Business Machines Corporation, Armonk, NY (US)

(72) Inventors: Masahiro Furukawa, Kanagawa (JP); Tomohiro Miyahira, Kanagawa (JP); Yoshiroh Kamiyama, Tokyo (JP); Christopher Johan Schaubach, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/880,410

(22) Filed: Oct. 12, 2015

(65) Prior Publication Data
US 2016/0034599 A1 Feb. 4, 2016

Related U.S. Application Data

(63) Continuation of application No. 13/549,595, filed on Jul. 16, 2012, now abandoned, which is a continuation of application No. 11/048,043, filed on Jan. 31, 2005, now Pat. No. 8,234,309.

(51) Int. Cl.
*G06F 7/00* (2006.01)
*G06F 17/00* (2006.01)
*G06F 17/30* (2006.01)

(52) U.S. Cl.
CPC .. *G06F 17/30961* (2013.01); *G06F 17/30625* (2013.01)

(58) Field of Classification Search
CPC .... G06F 17/00; G06F 17/30; G06F 17/30961; G06F 17/30625; G06F 7/52; G06F 7/508
See application file for complete search history.

(56) References Cited

U.S. PATENT DOCUMENTS

| | | | |
|---|---|---|---|
| 4,891,766 A | | 1/1990 | Derr et al. |
| 5,421,008 A | * | 5/1995 | Banning ........... G06F 17/30398 |
| 5,463,773 A | | 10/1995 | Sakakibara et al. |
| 5,471,613 A | * | 11/1995 | Banning ........... G06F 17/30398 |
| 5,574,910 A | | 11/1996 | Bialkowski et al. |
| 5,778,371 A | | 7/1998 | Fujihara |
| 5,825,944 A | | 10/1998 | Wang |

(Continued)

FOREIGN PATENT DOCUMENTS

| | | |
|---|---|---|
| EP | 295460 | 12/2008 |
| JP | 8137914 | 5/1996 |

(Continued)

*Primary Examiner* — Azam Cheema
(74) *Attorney, Agent, or Firm* — Lieberman & Brandsdorfer, LLC

(57) ABSTRACT

A method and system are provided to support automated modification to a multiple node tree structure. Each clause and each logical operator are defined in the tree structure as nodes. In addition, each link emanating from a child node to a parent node is defined as a child link, and each link emanating from a parent node to a child node is defined as a parent link. The selection and location of an operator for placement in the tree structure will be automated in response to the position selected.

6 Claims, 5 Drawing Sheets

(56) References Cited

U.S. PATENT DOCUMENTS

| | | |
|---|---|---|
| 6,334,156 B1 | 12/2001 | Matsuoka et al. |
| 6,385,612 B1 | 5/2002 | Troisi |
| 6,411,957 B1 | 6/2002 | Dijkstra |
| 6,978,271 B1 | 12/2005 | Hoffman et al. |
| 7,668,865 B2 | 2/2010 | McDonald |
| 7,734,628 B2 | 6/2010 | Chan et al. |
| 2001/0029510 A1 | 10/2001 | Tokui |
| 2002/0122422 A1* | 9/2002 | Kenney ............... H04L 41/0213 370/392 |
| 2003/0182565 A1 | 9/2003 | Nakano et al. |
| 2004/0205594 A1 | 10/2004 | Arora et al. |
| 2004/0267796 A1 | 12/2004 | Shimogori |
| 2005/0096880 A1* | 5/2005 | Morita ................ G06N 5/04 702/189 |
| 2006/0004563 A1 | 1/2006 | Campbell et al. |

FOREIGN PATENT DOCUMENTS

| | | |
|---|---|---|
| JP | 8237471 | 9/1996 |
| JP | 305363 | 11/1997 |
| JP | 194466 | 7/2000 |
| JP | 345717 | 12/2003 |

\* cited by examiner

AUTOMATICALLY MODIFYING A TREE STRUCTURE

CROSS REFERENCE TO RELATED APPLICATION(S)

This application is a continuation patent application claiming the benefit of the filing date of U.S. patent application Ser. No. 13/549,595 filed on Jul. 16, 2012 and titled "Automatically Modifying A Tree Structure," which is a continuation patent application claiming the benefit of the filing date of U.S. patent application Ser. No. 11/048,043 filed on Jan. 31, 2005 and titled "Method for Automatically Modifying A Tree Structure," now U.S. Pat. No. 8,234,309, both of which are hereby incorporated by reference.

BACKGROUND OF THE INVENTION

Technical Field

This invention relates to a method for modifying a logical expression. More specifically, the method automates placement of a new node to a parent node that supports at least three connecting nodes.

Description of the Prior Art

Data structures in the form of trees are known as efficient tools for building tables and supporting searches beginning with a known prefix. A tree is a data structure accessed first at the root node. Each subsequent node can be either an internal node with further subsequent nodes or an external node with no further nodes existing under the node. An internal node refers to or has links to one or more descending or child nodes and is referred to as the parent of its child nodes, and external nodes are commonly referred to as leaves. The root node is usually depicted at the top of the tree structure and the external nodes are depicted at the bottom.

Tree structures are often defined by the characteristics of the tree. For example, a Binary Tree is a tree with at most two children for each node. A Digital Tree is a rooted tree where the leaves represent strings of digital symbols. The Patricia Tree is a Digital Tree with suppression of one way branching that prohibits keys which are strict prefixes of other branches. In general, a Patricia tree is always a digital tree, but only a binary tree when the symbol alphabet is binary. The internal nodes represent a common prefix to a set of strings, and each child of that node corresponds to a choice of the next symbol to follow the common prefix. A Patricia Tree can take the form of a Binary Tree and a Digital Tree where all internal nodes have at least two children.

Problems arise in adding leaves to the tree structure. In a Binary Tree where there is at most two children for each node, adding a leaf to the tree is straight forward. However, problems arise in a multiple node tree which supports more than two child nodes for each parent node. Prior art methods for modifying a tree structure that supports more than two children per node require a person to specify whether it is an operation to add a binary operator or to add a node to the tree. However, this method is time consuming as the person must select the location and operator for each child node to be added to the tree structure. Therefore, there is a need that supports automating placement of a new node in a tree structure that supports more than two children per node.

SUMMARY OF THE INVENTION

This invention comprises a method and system for automating modification of a multiple node supporting tree structure based upon selection of a location for addition of a new child node.

In one aspect, a method is provided to amend a multiple node tree structure. Data storage media is provided to store the tree structure, with the tree structure including multiple nodes. Each node type is in the form of a logical operator or a logical clause, and each node in the tree structure is classified as a child node or as a parent node. Links within each connection between each child node and each parent node are also classified. Each connection includes two or more child links and a parent link. The two or more child links are defined as branches within the connection, with the branches emanating from the child node. The parent link is defined as a trunk within the connection, with the trunk emanating from the parent node. To add a new node, a link within the tree structure is selected. A type of the new node to be added to the tree structure is defined by a classification of the selected link within a selected connection corresponding to the selected link.

In another aspect, a system is provided to amend a node tree structure. Data storage media is provided to store the tree structure, with the tree structure including multiple nodes. A type of each node is either a logical operator or a logical clause. A classification manager is provided to classify each node in the tree structure as a child node or as a parent node. The classification manager classifies links within each connection between each child node and each parent node. Each connection includes two or more child links and a parent link. The two or more child links are defined as branches within the connection, with the branches emanating from the child node. The parent link is defined as a trunk within the connection, with the trunk emanating from the parent node. A selection manager is provided to select a link within the tree structure to add a new node. A type of the new node to be added to the tree structure is defined by a classification of the selected link within a selected connection corresponding to the selected link.

In yet another aspect, an article is provided with a computer-readable storage medium having instructions to amend a node tree structure. Instructions are provided to store the tree structure, the tree structure including multiple nodes. A type of each node in the tree structure is either a logical operator or a logical clause. Instructions are provided to classify each node in the tree structure as a child node or as a parent node. Instructions are also provided to classify links within each connection between each child node and each parent node, wherein each connection includes two or more child links and a parent link. The two or more child links are defined as branches within the connection, with the branches emanating from the child node. The parent link is defined as a trunk within the connection, with the trunk emanating from the parent node. Instructions are provided to select a link within the tree structure for adding a new node. A type of the new node to be added to the tree structure is defined by a classification of the selected link within a selected connection corresponding to the selected link.

Other features and advantages of this invention will become apparent from the following detailed description of the presently preferred embodiment of the invention, taken in conjunction with the accompanying drawings.

DESCRIPTION OF THE EMBODIMENTS

Overview

Automating the process of modifying a binary tree structure in the form of adding a new node to a node that can only have two child nodes is known in the art. However, in a tree structure where each node can have three or more nodes, i.e. N-ary operators, automating the process of modifying the tree structure when a new node is added becomes complicated. In one embodiment of the invention, a distinction is made between a parent node and a child node, and connections near a child node, known as a child link, and connections near a parent node, known as a parent link.

Technical Details

Figure 1:
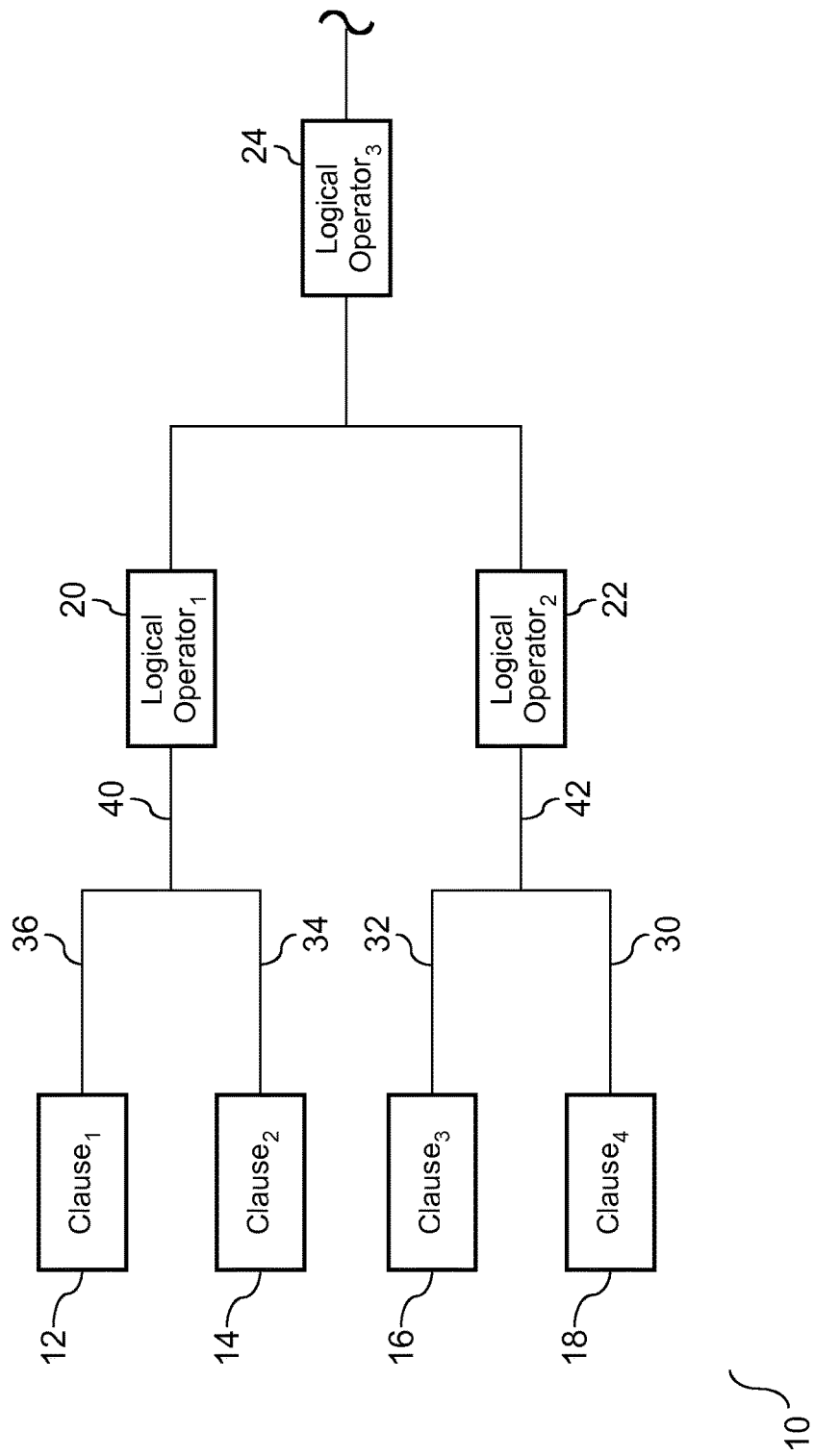
FIG. 1 is a prior art diagram of a tree structure.

FIG. 1 is a block diagram (10) of a tree structure with four clauses (12), (14), (16), (18), represented as nodes, and three logical operators (20), (22), and (24). Each clause (12), (14), (16), and (18) is defined as a child node from the perspective of the logical operators (20) and (22). Similarly, each logical operator (20), (22), (24) is defined as a node, with logical operator$_1$ node (20) and logical operator$_2$ node (22) being parents nodes to clauses (12), (14), (16), and (18), and logical operator$_3$ node (24) being a parent node to logical operator$_1$ node (20) and logical operator$_2$ node (22). Logical operator$_1$ node (20) is a parent node to clause$_1$ (12) and clause$_2$ node (14), and logical operator$_2$ node (22) is a parent node to clause$_3$ node (16) and clause$_4$ node (18). Although both logical operator$_1$ node (20) and logical operator$_2$ node (22) are parent nodes to the defined child node, they may be defined as child nodes to logical operator$_3$ node (24). It is important to note that a logical operator can be a child node as well. However, in the example shown herein the logical operator nodes are parent nodes to the defined child nodes. A connection from the clause$_4$ node (18) to the logical operator$_2$ node (22) is defined as a child link (30), and a connection from clause$_3$ node (16) to logical operator$_2$ node (22) is also defined as a child link (32). Similarly, a connection from the clause$_2$ node (14) to logical operator$_1$ node (20) is defined as a child link (34), and a connection from the clause$_1$ node (12) to logical operator$_1$ node (20) is defined as child link (36). In addition to the child links as defined, parent links are the connections emanating from the parent node. A connection from logical operator$_1$ node (20) to child links (34) and (36) is defined as parent link (40), and a connection from logical operator$_2$ node (22) to child links (30) and (32) is defined as parent link (42). Accordingly, each node and each link connecting nodes are defined in the tree structure.

Figure 2A:
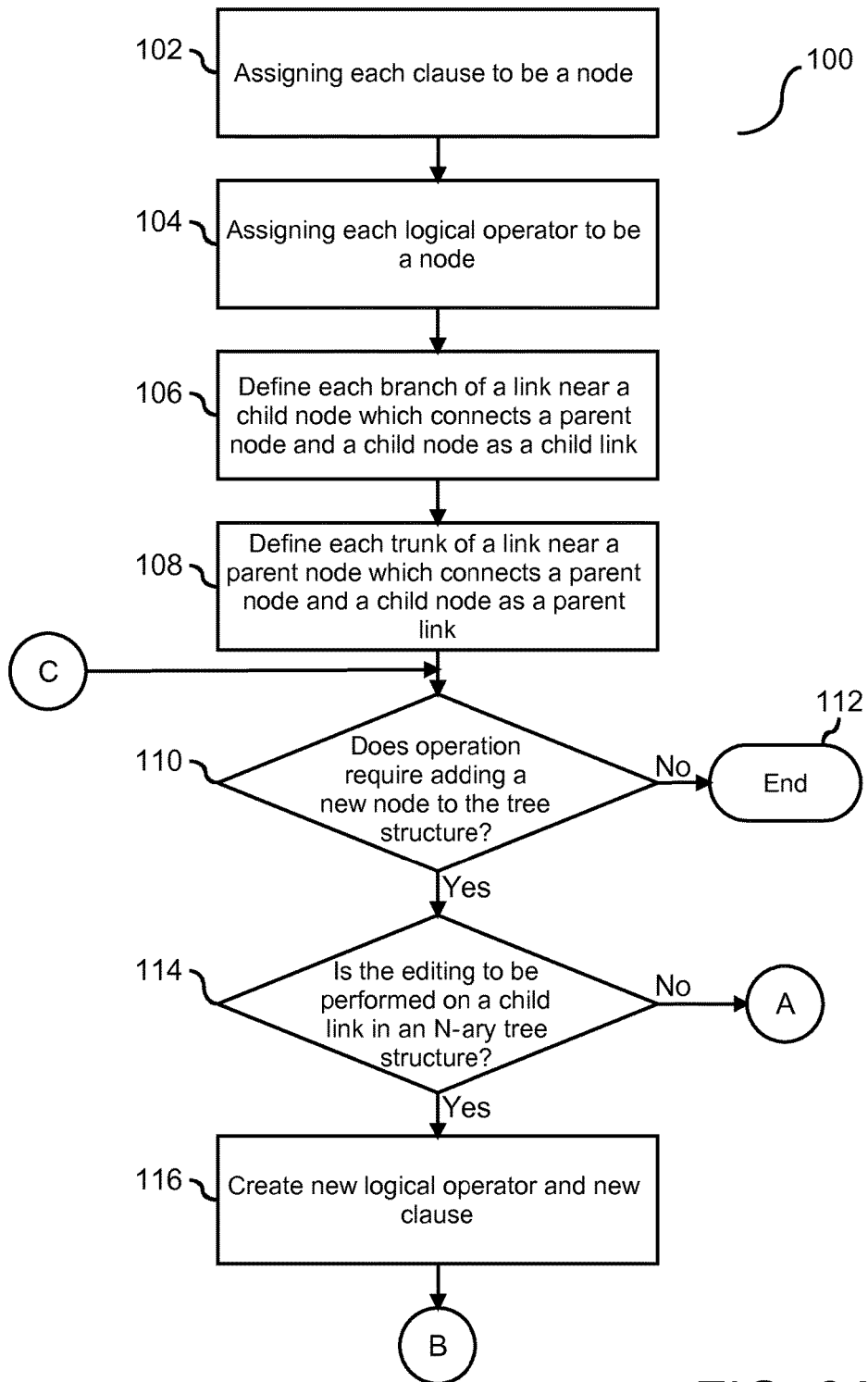
FIGS. 2A and 2B are flow charts illustrating a process for modifying a tree structure according to the preferred embodiment of this invention, and is suggested for printing on the first page of the issued patent.
Figure 2B:
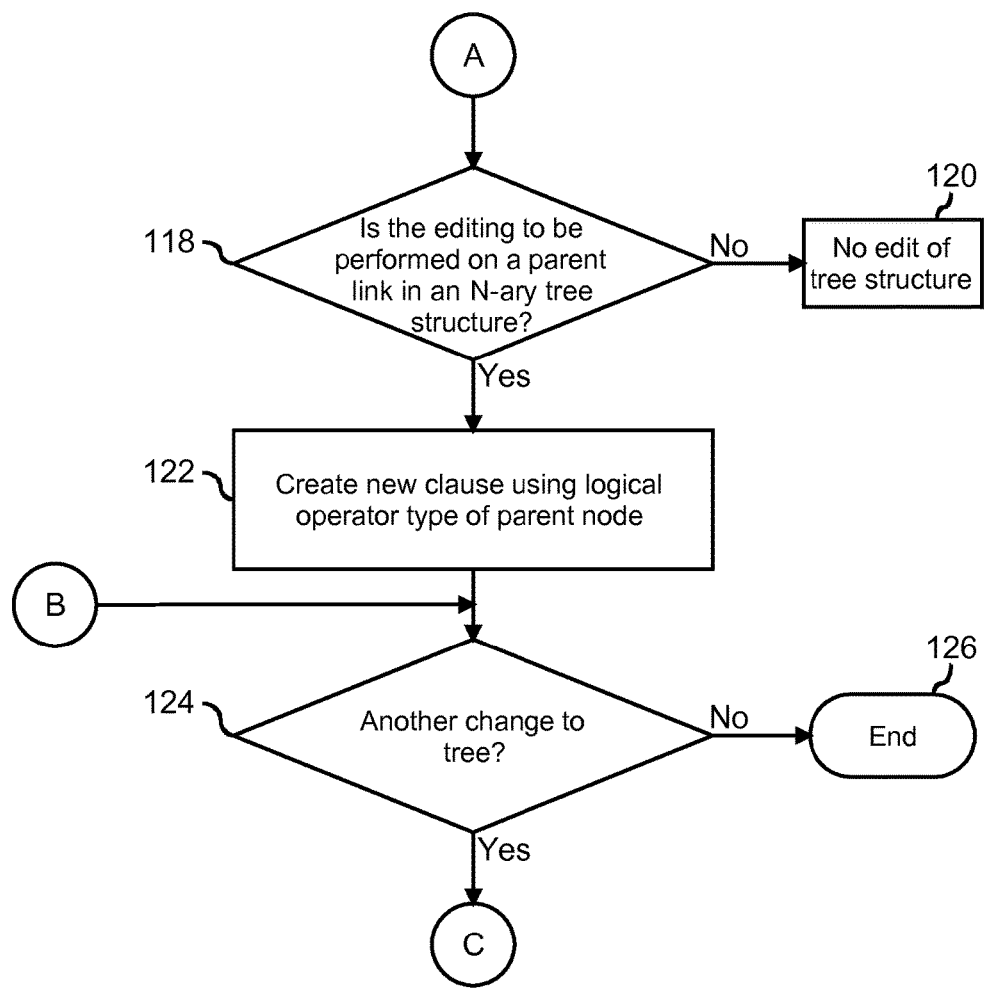

Once each of the elements in the tree structure are defined, modification of the tree structure may be automated. FIGS. 2A and 2B are a flow chart (100) illustrating a process for automating selection and placement of a new node in a tree structure. Each clause in the tree structure is designated as a node (102), and each logical operator in the tree structure is designated as a node (104). Furthermore, each link near a child node among the links which connect a parent node and a child node, the portion of the branch, is defined as a child link (106), and each link near a parent node among the links which connect a parent node and a child node, the portion of the trunk, is defined as a parent link (108). Before initiating a change to the tree structure, a test is conducted to determine if the change requires adding a new node to the tree structure (110). A negative response to the test at step (110) is an indication that the change may be in the form of editing an existing node, whether it be one or more of the logical operators or one of more of the clauses in the tree structure. As such, the process of adding a new node to the existing tree structure ends (112). However, if the response to the test at step (110) is positive, a subsequent test is conducted to determine if the new node to be added to the tree structure is located on a child link in a multiple node supporting tree structure (114) as defined at step (106). A positive response to the test at step (114) will result in creation of a new logical operator and a new clause in the multiple node supporting tree structure (116). However, a negative response to the test at step (114) or following the completion of step (116) will result in another test to determine if the new node to be added to the tree structure is located on a parent link in a multiple node supporting tree structure (118) as define at step (108). If the response to the test at step (118) is negative, this is an indication that the modification of the tree structure does not include addition of a new node to the tree structure (120). However, a positive response to the test at step (118) will result in creation of a new clause in the form of a new child node using the logical operator type of the parent node (122). Following the creation of the new node at step (122), a final test is conducted to determine if there are any additional changes to be made to the tree structure (124). A positive response to the test at step (124) will result in a return to step (110) to determine the location and modification to be made to the tree structure. Similarly, a negative response to the test at step (124) will result in a conclusion of modifications to the tree structure (126). Accordingly, the process of determining the placement and category of a modification to a tree structure is automated based upon the specified location of the modification.

As described in FIGS. 2A and 2B, each clause is defined as a node and each logical operator is defined as a node. In one embodiment, the logic shown in FIGS. 2A and 2B may be embodied into a tool that includes an interface to enable a user to intuitively modify a tree structure. The tool may be stored on a computer-readable storage medium as it is used to modify data in a machine readable format. The tool may include a requestor to determine the need for modifying the tree structure and to communicate with a manager to select the location and modification of the tree structure. The requestor and manager of the tool manager may be in the form of hardware elements within the computer system, or software elements in a computer-readable storage medium.

Figure 3:
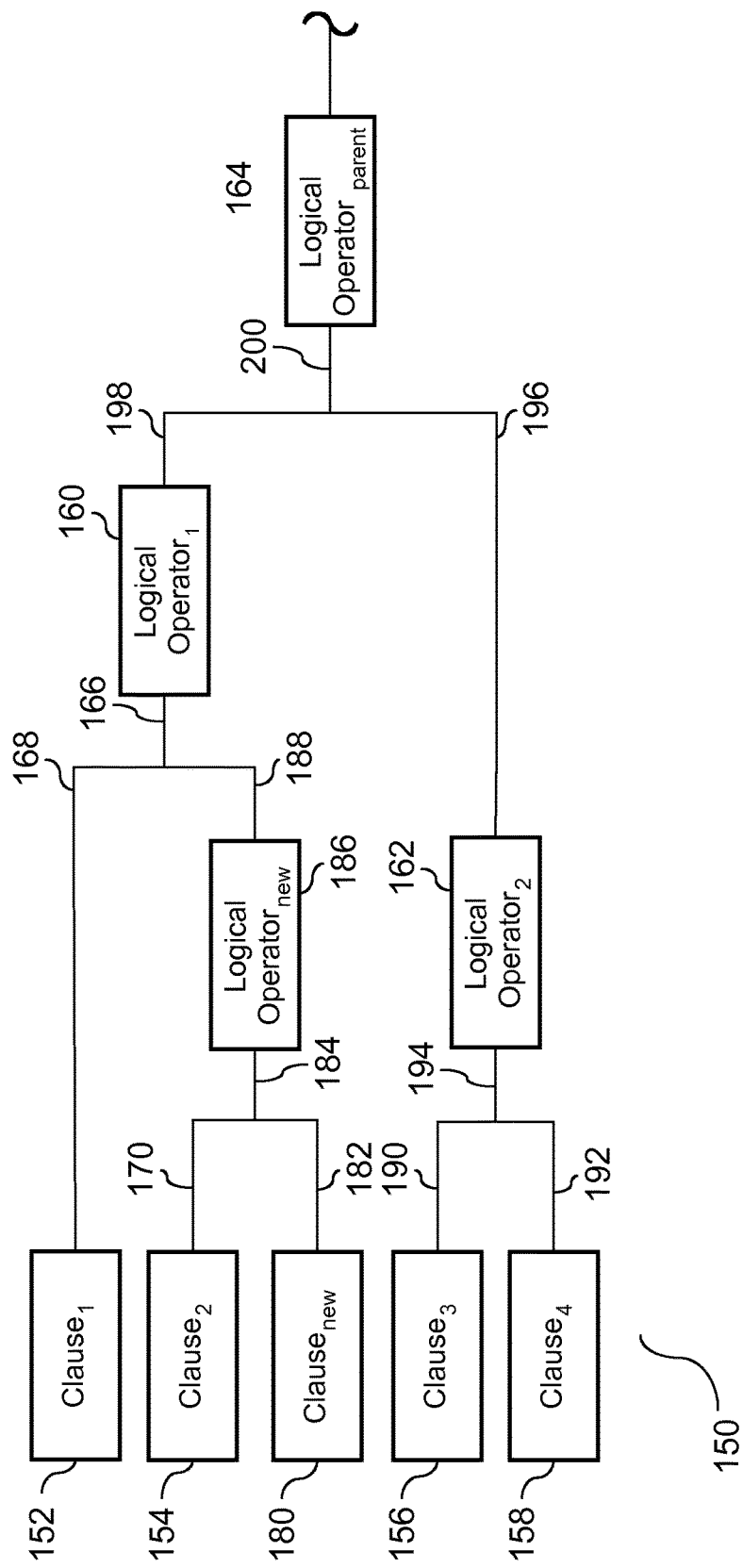
FIG. 3 is a block diagram of a modified tree structure following selection of a child link.

FIG. 3 is a block diagram (150) of the modified tree structure of FIG. 1 after editing a binary operator on child link (34). As shown, there are four original clauses (152), (154), (156), and (158), and three original logical operator nodes (160), (162) and (164). Each clause node has a child link connected to a parent link of a logical operator node. Following the process of editing the binary operator on child link (34), a new clause$_{NEW}$ node (180) is created with a new child link (182) in communication a new parent link (184) of a new node, logical operator$_{NEW}$ (186). Similarly, clause$_1$ node (152) retains child link (168) in communication with parent link (166) of logical operator$_1$ node (160), clause$_2$ node (154) obtains a new child link (170) in communication with new link (184) of a new logical operator$_{NEW}$ node (186), clause$_3$ node (156) retains child link (190) in communication with parent link (194) of logical operator$_2$ node (162), and clause$_4$ node (158) retains child link (192) in communication with parent link (194) of logical operator$_2$ node (162). Accordingly, the process of editing a child link to add a new logical operator in a tree structure that support multiple nodes results in creation of both a new child node having a new clause and a new parent node in the form of a logical operator.

Figure 4:
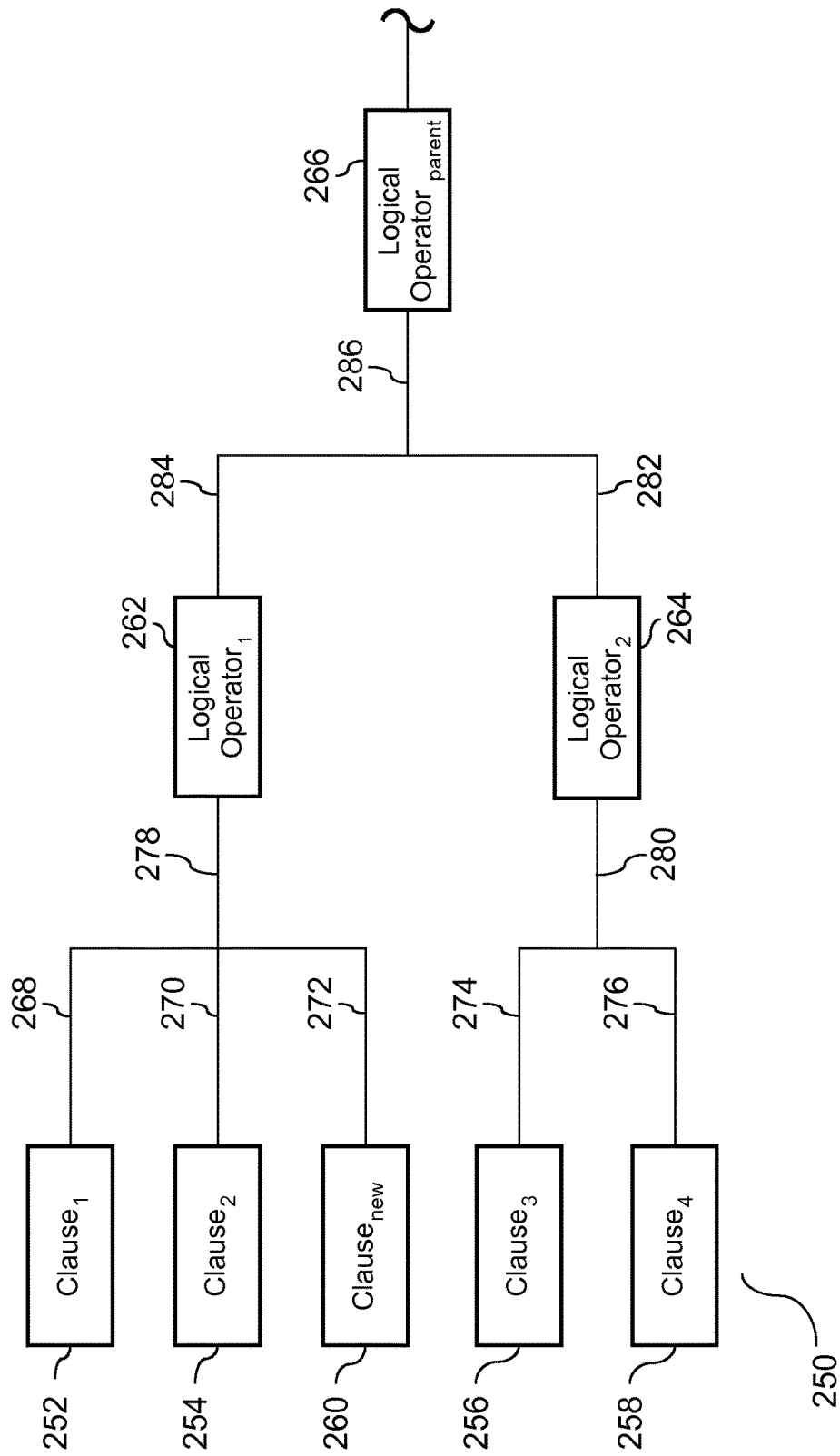
FIG. 4 is a block diagram of a modified tree structure following selection of a parent link.

FIG. 4 is a block diagram (250) of the modified tree structure of FIG. 1 after editing a binary operator on parent link (40). As shown, there are four original clauses (252), (254), (256), and (258), and three original logical operator nodes (262), (264), and (266). Each clause node has a child link connected to a parent link of a logical operator node. Following the process of editing the binary operator on parent link (278), a new clause$_{NEW}$ node (260) is created with a new child link (272) in communication with the original parent link (278) of logical operator$_1$ node (262). Similarly, clause$_1$ node (252) has a child link (268) in communication with parent link (278) of logical operator$_1$ node (262), clause$_2$ node (254) has a child link (270) in communication with parent link (278) of logical operator$_1$ node (262), clause$_3$ (256) has a child link (274) in communication with parent link (280) of logical operator$_2$ node (264), and clause$_4$ (258) has a child link (276) in communication with parent link (280) of logical operator$_2$ node (264). Accordingly, the process of editing a parent link to add a new logical operator in a tree structure that supports multiple nodes results in creation of a new clause with three or more child nodes (252), (254) and (260) all in communication with parent link (278).

Advantages Over the Prior Art

The classification of each node and each connection in a multiple node supporting tree structure supports automated editing of the tree structure. Each part of a link, whether it is a child link or a parent link, performs an operation related to a nearby node. The location of the proposed change to the tree structure automatically selects the type of node to be added to the tree structure. When the link selected for editing is associated with a multiple clause operator, a new child may be created to the node so that the node support three or more leaves. Accordingly, the tool supports automatically editing a multiple node tree structure based upon a selection of a link within the tree structure.

Alternative Embodiments

It will be appreciated that, although specific embodiments of the invention have been described herein for purposes of illustration, various modifications may be made without departing from the spirit and scope of the invention. In particular, the method and tool shown herein may be applied to a binary tree to support automated modifications to the tree structure. Accordingly, the scope of protection of this invention is limited only by the following claims and their equivalents.

We claim:

1. A method comprising:
    non-transitory computer readable storage media for storing a tree structure, the tree structure including multiple nodes, a type of each node selected from a group consisting of: a logical operator and a logical clause;
    classifying each node in the tree structure as a child node or a parent node, wherein the tree structure includes at least one parent node being an n-ary operator;
    classifying links within each connection between each child node and each parent node, wherein each connection includes two or more child links and a parent link, the two or more child links defined as branches within the connection, the branches emanating from the child node, and the parent link defined as a trunk within the connection, the trunk emanating from the parent node;
    selecting a child link or parent link within the tree structure for adding a new node, wherein a type of the new node to be added to the tree structure is defined by a classification of the selected link within a selected connection corresponding to the selected link; and
    creating a new operator node on the selected parent link and a new clause node on a new child link within the selected connection if the selected link is classified as the parent link.

2. The method of claim 1, further comprising creating the new clause node on the new child link within the selected connection if the selected link is classified as the child link.

3. A system comprising:
    non-transitory computer readable storage media to store a tree structure, the tree structure including multiple nodes, a type of each node selected from a group consisting of: a logical operator and a logical clause;
    a classification manager to classify each node in the tree structure as a child node or as a parent node, wherein the tree structure includes at least one parent node being an n-ary operator;
    the classification manager to classify links within each connection between each child node and each parent node, wherein each connection includes two or more child links and a parent link, the two or more child links defined as branches within the connection, the branches emanating from the child node, and the parent link is defined as a trunk within the connection, the trunk emanating from the parent node;
    a selection manager to select a child link or parent link within the tree structure for adding a new node, wherein a type of the new node to be added to the tree structure is defined by a classification of the selected link within a selected connection corresponding to the selected link; and
    the selection manager to create a new operator node on the selected parent link and a new clause node on a new child link within the selected connection if the selected link is classified as the parent link.

4. The system of claim 3, further comprising the selection manager to create a new clause node on a new child link within the selected connection if the selected link is classified as a child link.

5. An article comprising:
    a non-transitory computer-readable storage medium, the storage medium including instructions for amending a node tree structure comprising, the instructions comprising:
    instructions to store the tree structure, the tree structure including multiple nodes, wherein the tree structure includes at least one parent node being an n-ary operator, and a type of each node selected from a group consisting of: a logical operator and a logical clause;
    instructions to classify each node in the tree structure as a child node or as a parent node;
    instructions to classify links within each connection between each child node and each parent node, wherein each connection includes two or more child links and a parent link, the two or more child links defined as branches within the connection, the branches emanating from the child node, and the parent link is defined as a trunk within the connection, the trunk emanating from the parent node;

instructions to select a child link or parent link within the tree structure for adding a new node, wherein a type of the new node to be added to the tree structure is defined by a classification of the selected link within a selected connection corresponding to the selected link; and instructions to create a new operator node on the selected parent link and a new clause node on a new child link within the selected connection if the selected link is classified as the parent link.

6. The article of claim 5, further comprising instructions to create a new clause node on a new child link within the selected connection if the selected link is classified as a child link.

\* \* \* \* \*